United States Patent
Haeupler et al.

(10) Patent No.: US 10,103,384 B2
(45) Date of Patent: Oct. 16, 2018

(54) ELECTROACTIVE POLYMERS, MANUFACTURING PROCESS THEREOF, ELECTRODE AND USE THEREOF

(71) Applicant: EVONIK DEGUSSA GmbH, Essen (DE)

(72) Inventors: Bernhard Haeupler, Erlangen (DE); Ulrich Schubert, Jena (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 14/903,864

(22) PCT Filed: Jul. 9, 2013

(86) PCT No.: PCT/EP2013/002018
§ 371 (c)(1),
(2) Date: Jan. 8, 2016

(87) PCT Pub. No.: WO2015/003725
PCT Pub. Date: Jan. 15, 2015

(65) Prior Publication Data
US 2016/0233509 A1    Aug. 11, 2016

(51) Int. Cl.
| | |
|---|---|
| *H01M 4/60* | (2006.01) |
| *H01M 4/62* | (2006.01) |
| *H01M 4/86* | (2006.01) |
| *H01M 4/90* | (2006.01) |
| *C08F 112/14* | (2006.01) |
| *C08F 226/10* | (2006.01) |
| *H01G 11/30* | (2013.01) |
| *H01G 9/042* | (2006.01) |

(52) U.S. Cl.
CPC ........... *H01M 4/604* (2013.01); *C08F 112/14* (2013.01); *C08F 226/10* (2013.01); *H01M 4/623* (2013.01); *H01M 4/625* (2013.01); *H01M 4/8668* (2013.01); *H01M 4/8673* (2013.01); *H01M 4/9008* (2013.01); *H01G 9/042* (2013.01); *H01G 11/30* (2013.01)

(58) Field of Classification Search
None
See application file for complete search history.

(56) References Cited

U.S. PATENT DOCUMENTS

| | | | |
|---|---|---|---|
| 4,898,915 A | 2/1990 | Harwood et al. | |
| 5,336,314 A * | 8/1994 | Lamers | C08G 63/6854 106/400 |
| 6,403,239 B2 | 6/2002 | Chen et al. | |
| 2002/0034690 A1 | 3/2002 | Ono | |

(Continued)

FOREIGN PATENT DOCUMENTS

| | | |
|---|---|---|
| CN | 1900305 A | 1/2007 |
| CN | 101752539 A | 6/2010 |

(Continued)

OTHER PUBLICATIONS

English text machine translation for Nakamura et al. (JP 2001-167885 A), accessed from the JPO AIPN website, (Year: 2001).*

(Continued)

*Primary Examiner* — Katie L Hammer
(74) *Attorney, Agent, or Firm* — Oblon, McClelland, Maier & Neustadt, L.L.P.

(57) ABSTRACT

Disclosed is an oligomeric or polymeric compound comprising at least two structural units of formula (I) wherein Ar is a carbocyclic aromatic radical or a heterocyclic aromatic radical with the two carbonyl carbon atoms being attached to two ring carbon atoms of the Ar group forming together with the imide-nitrogen atom a five-membered or a six-membered ring X is a divalent group selected from —$CR^1R^2$—, —CO—, —$SiR^3R^4$—, —$P(O)R^5$—, —$P(O)(OR^6)$—, —$PR^7$—, —$P(OR^8)$—, —S(O)— or —$S(O)_2$—. $R^1$ to $R^8$ independently of one another are hydrogen, alkyl, cycloalkyl, aryl or heteroaryl groups, $R^9$ is a divalent hydrocarbon group or a covalent bond, and $R^{10}$, $R^{11}$ and $R^{12}$ independently of one another are hydrogen or $C_1$-$C_6$ alkyl or $R^{10}$ and $R^{11}$ or $R^{10}$ and $R^{12}$ together with the carbon atoms to which they are attached form a cycloaliphatic ring or a bicyclic aliphatic system The oligomeric or polymeric compound comprising units of formula (I) of the invention can be used as redox-active material in storage means for electric energy, for example in batteries, redox-flow cells, fuel cells or capacitors.

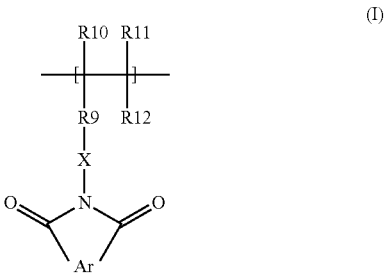

(I)

19 Claims, No Drawings

(56) References Cited

U.S. PATENT DOCUMENTS

| | | | |
|---|---|---|---|
| 2003/0062080 A1 | 4/2003 | Satoh et al. | |
| 2003/0096165 A1 | 5/2003 | Nakahara et al. | |
| 2008/0057396 A1 | 3/2008 | Fujihara et al. | |
| 2009/0087731 A1 | 4/2009 | Fukui et al. | |
| 2009/0246632 A1 | 10/2009 | Fukui et al. | |
| 2010/0167129 A1 | 7/2010 | Wu et al. | |
| 2010/0252112 A1* | 10/2010 | Watson | C08G 61/123 136/263 |
| 2010/0330424 A1 | 12/2010 | Kobayashi et al. | |
| 2011/0006294 A1 | 1/2011 | Tanaka et al. | |
| 2011/0076534 A1 | 3/2011 | Kobayashi et al. | |
| 2011/0207021 A1* | 8/2011 | Fujinami | H01M 8/1023 429/494 |
| 2011/0217577 A1 | 9/2011 | Fukui et al. | |
| 2011/0311871 A1 | 12/2011 | Fukui et al. | |
| 2012/0171561 A1 | 7/2012 | Iwasa et al. | |
| 2012/0187387 A1 | 7/2012 | Sekiguchi et al. | |
| 2012/0196184 A1 | 8/2012 | Tanaka et al. | |
| 2012/0202117 A1 | 8/2012 | Hirose et al. | |
| 2012/0241005 A1 | 9/2012 | Yamaguchi et al. | |
| 2012/0258354 A1 | 10/2012 | Yamaguchi et al. | |
| 2012/0315537 A1 | 12/2012 | Ravdel et al. | |
| 2013/0164629 A1 | 6/2013 | Hou et al. | |
| 2013/0183782 A1 | 7/2013 | Mima et al. | |
| 2013/0184385 A1 | 7/2013 | Ogihara | |
| 2013/0189571 A1 | 7/2013 | Abouimrane et al. | |
| 2013/0224538 A1 | 8/2013 | Jansen et al. | |
| 2013/0302702 A1 | 11/2013 | Matsumoto | |
| 2013/0323587 A1 | 12/2013 | Kose et al. | |
| 2014/0005344 A1 | 1/2014 | Rinker et al. | |
| 2014/0011089 A1 | 1/2014 | Yamada et al. | |
| 2014/0017559 A1 | 1/2014 | Kawasaki et al. | |
| 2014/0017572 A1 | 1/2014 | Uehara et al. | |
| 2014/0030593 A1 | 1/2014 | Kim et al. | |
| 2014/0045063 A1 | 2/2014 | Iriyama et al. | |
| 2014/0048786 A1 | 7/2014 | Suzuka et al. | |
| 2014/0186699 A1 | 7/2014 | Kato et al. | |
| 2015/0175738 A1 | 6/2015 | Willy et al. | |
| 2015/0175740 A1 | 6/2015 | Willy et al. | |

FOREIGN PATENT DOCUMENTS

| | | |
|---|---|---|
| CN | 102005301 A | 4/2011 |
| CN | 102383222 A | 3/2012 |
| CN | 101826599 A | 5/2012 |
| CN | 101826599 B | 5/2012 |
| CN | 102522528 A | 6/2012 |
| CN | 102640330 A | 8/2012 |
| CN | 102668108 A | 9/2012 |
| CN | 102683744 A | 9/2012 |
| CN | 102712768 A | 10/2012 |
| DE | 197 33 882 A1 | 2/1999 |
| EP | 2 104 175 A2 | 9/2009 |
| JP | 1-263646 A | 10/1989 |
| JP | 2-55301 A | 2/1990 |
| JP | 03-754 A | 1/1991 |
| JP | 09-87326 | 3/1997 |
| JP | 2001167885 A * | 6/2001 |
| JP | 2001-307738 A | 11/2001 |
| JP | 2002-117854 A | 4/2002 |
| JP | 2002-117855 A | 4/2002 |
| JP | 2002-141067 A | 5/2002 |
| JP | 2002-313344 A | 10/2002 |
| JP | 2004-179169 A | 6/2004 |
| JP | 2004-247233 A | 9/2004 |
| JP | 2004-259618 A | 9/2004 |
| JP | 2004-263153 A | 9/2004 |
| JP | 2005-8689 A | 1/2005 |
| JP | 2005-11562 A | 1/2005 |
| JP | 2005-209498 A | 8/2005 |
| JP | 2006-252917 A | 9/2006 |
| JP | 2008-282550 A | 11/2008 |
| JP | 2009-76373 A | 4/2009 |
| JP | 2009-104819 A | 5/2009 |
| JP | 2009-245773 A | 10/2009 |
| JP | 2010-55923 A | 3/2010 |
| JP | 2010-73572 A | 4/2010 |
| JP | 2010-146839 A | 7/2010 |
| JP | 2010-150312 A | 7/2010 |
| JP | 2010-205609 A | 9/2010 |
| JP | 2011-9129 A | 1/2011 |
| JP | 2011-60559 A | 3/2011 |
| JP | 2011-60560 A | 3/2011 |
| JP | 2011-76743 A | 4/2011 |
| JP | 2011-86427 A | 4/2011 |
| JP | 2011-187169 A | 9/2011 |
| JP | 2011-216320 A | 10/2011 |
| JP | 2012-129068 A | 7/2012 |
| JP | 2012-190545 A | 10/2012 |
| JP | 2012-204203 A | 10/2012 |
| JP | 2012-209219 A | 10/2012 |
| JP | 5099394 B1 | 10/2012 |
| JP | 2012-238396 A | 12/2012 |
| JP | 2012-252841 A | 12/2012 |
| JP | 2012-256542 A | 12/2012 |
| WO | WO 98/35397 A1 | 8/1998 |
| WO | WO 2008/117236 A2 | 10/2008 |
| WO | WO 2009/113585 A1 | 9/2009 |
| WO | WO 2011/034117 A1 | 3/2011 |
| WO | WO 2011/045907 A1 | 4/2011 |
| WO | WO 2011/068097 A1 | 6/2011 |
| WO | WO 2011/068217 A1 | 6/2011 |
| WO | WO 2011/071106 A1 | 6/2011 |
| WO | WO 2011/078321 A1 | 6/2011 |
| WO | WO 2012/017738 A1 | 2/2012 |
| WO | WO 2012/027917 A1 | 3/2012 |
| WO | WO 2012/115093 A1 | 8/2012 |
| WO | WO 2012/132059 A1 | 10/2012 |
| WO | WO 2012/132060 A1 | 10/2012 |
| WO | WO 2012/132396 A1 | 10/2012 |
| WO | WO 2012/141532 A2 | 10/2012 |
| WO | WO 2012/147930 A1 | 11/2012 |
| WO | WO 2012/161180 A1 | 11/2012 |
| WO | WO 2012/170789 A2 | 12/2012 |
| WO | WO 2013/002369 A1 | 1/2013 |
| WO | WO 2013/009750 A2 | 1/2013 |
| WO | WO 2013/099567 A1 | 7/2013 |

OTHER PUBLICATIONS

International Search Report and Written Opinion dated Aug. 6, 2013 in PCT/EP2013/002018 filed Jul. 9, 2013.

Kenichi Oyaizu, et al., "Redox-active polyimide/carbon nanocomposite electrodes for reversible charge storage at negative potentials: expanding the functional horizon of polyimides", Journal of Materials Chemistry, 20, 2010, pp. 5404-5410.

Written Opinion dated Nov. 2, 2016 in Singaporean Patent Application No. 11201600151X.

Combined Chinese Office Action and Search Report dated Jan. 3, 2017 in Patent Application No. 201380079474.3 (with English translation).

Xing Wei, et al., "Polyimide Modified Electrode" Chinese Journal Analytical Chemistry, vol. 22. 1994, pp. 1073-1078 (with English translation).

Lee C. Dunn, et al., "Synthesis and Conductivity of Poly Acene Quinone Radical Polymers" Journal of Polymer Science, vol. 22. 1984, pp. 2243-2260.

Tobias Janoschka, et al., "Storage Devices—Radically Organic" Polyme re, 2012, pp. 728-731 (with English translation).

Von H. Hopff, et al., "On 2-Vinylthianthrene and its Polymerization Products" Industrial Chemistry Laboratory of the Swiss Federal Institute of Technology, 1963, pp. 129-138 (with English translation).

* cited by examiner

ELECTROACTIVE POLYMERS, MANUFACTURING PROCESS THEREOF, ELECTRODE AND USE THEREOF

The present invention relates to electroactive polymers and to a manufacturing process thereof. The polymers can be used for manufacturing of electrodes which can be used in different energy storage devices, such as batteries. The devices for energy storage containing the polymer compounds of this invention as active electrode material can be designed for high voltages and possess high efficiency, high power density and long life time.

Organic polymers, such as polyimides, have been known as components in energy storage devices.

Phthalimide polymers can be used as packaging materials for electric components (WO 2011078321).

Copolymers comprising phthallmide units can be used as active material in solar panels (CN 101826599).

Phthalimide-containing polymers are proposed as separator materials in electrochemical components (WO 2013009750, WO 2012161180, CN 102522528, CN 102383222, WO 2012027917, JP 2011060560, JP 2010146839, CN 101752539). There is no disclosure of using these materials as electroactive components.

US-A-2010/0167129 discloses to use phthalimide-containing polymers as solid electrolyte interface (SEI) in Lithium-ion batteries. These polymers are used to protect the batteries against heat damage.

Polyimide-containing polymers are proposed as binders for general purposes including binders for electrodes (JP 2012-129068). There is no disclosure of using these materials as electroactive components.

Use of polyimide-containing polymere as binder additives in secondary batteries is also disclosed (WO 2013/002369, JP 2012-256542, JP2012-252841, JP5099394, US 2012/0315537, WO 2012/170789, JP2012-238396, JP 2012-209219, JP 2012-204203, WO 2012/132396, WO 2012/132059, WO 2012/132060, WO2012/115093, US 2012/0196184, WO 2012/017738, US 2011/0311871, JP 2011.216320, JP 2011-187169, WO 2011/068097, JP 2011-009129, US 2010/0330424, JP 2010-205609, JP2010-73572, US 2009/0246632, EP 2104175, WO 2008/117236, US 2008/0057396, JP 2004-247233 and WO1998035397). There is no disclosure to use these polymers for electrical energy storage.

Phthalimide-containing silicondioxide-comprising hybrid resins are proposed as electrode material in secondary batteries. The polymers are used as binder resins for the silicondioxide particles (JP 2011-086427, WO 2011/045907, JP 2011-076743, JP 2009-245773, JP 2009-076373, US 2009/0087731).

The use of polyimide-containing polymers as active anode or cathode material in organic secondary batteries is also known (WO 2012/141532, US 2011/0217577, WO 2012/170789, WO 2009/113585, WO 2011/071106, US 2011/0076534, JP2011-060559, JP 2008-282550, WO 2012/147930, CN 102683744).

Conventional polyimides contain the polymer units in the polymer backbone. A typical polyimide of the conventional type is represented by the formula

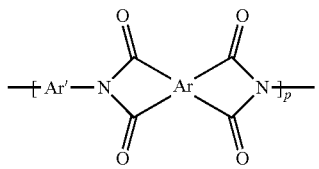

wherein Ar is a tretravalent aromatic group, Ar' is a divalent aromatic group and p is an integer indicating the number of recurring units and, therefore, the length of the polymer backbone.

Therefore, in conventional polyimides the active unit is in the polymer backbone. The selection of a predetermined redox potential is difficult as in general only one kind of monomers is used in the manufacture of the polyimide. Furthermore, these polyimides are difficult to manufacture. In general a multi-step synthesis is necessary starting from a condensation of the aromatic tetracarboxylic acids with aromatic diamines and resulting in a non-fully condensed amidocarboxylic acid. This in general is processed and thereafter the final condensation to the polyimide is performed. The final polyimide is often no more soluble and is difficult to process. Experiments have shown that the capacity of these polyimides as active materials is far below the theoretically possible capacity.

Surprisingly novel polymide-group containing polymers have been found which are especially applicable as redox-active electrode material in anodes or cathodes.

The novel polymers are easy to prepare from easily accessible starting materials. The redox potential of the polymers of this invention can be adapted to a predetermined value by choosing monomers with appropriate substitution. Furthermore, the polymers of this invention have a high capacity and show a long lifetime.

One objective of this invention is the provision of polymers which are suited as redox-active materials in energy storage applications and which are distinguished from prior art materials by a high redox-capacity, a long lifetime.

Another objective of this invention is the provision of polymers which are easy to prepare and which are derived from easily accessible starting materials.

Another objective of this invention is the provision of a process for the production of redox-active imide-polymers which is easy to implement and results in polymers with high yields.

The present invention relates to oligomeric or polymeric compounds comprising at least two structural units of formula I

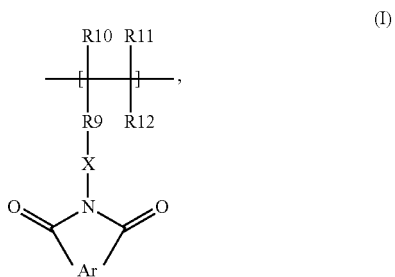

wherein
Ar is a carbocyclic aromatic radical or a heterocyclic aromatic radical with the two carbonyl carbon atoms being attached to two ring carbon atoms of the Ar group forming together with the imide-nitrogen atom a five-membered or a six-membered ring,
X is a divalent group selected from —$CR^1R^2$—, —CO—, —$SiR^3R^4$—, —$P(O)R^5$—, —$P(O)(OR^6)$—, —$PR^7$—, —$P(OR^8)$—, —S(O)— or —$S(O)_2$—,
$R^1$ to $R^8$ independently of one another are hydrogen, alkyl, cycloalkyl, aryl or heteroaryl groups,
$R^9$ is a divalent hydrocarbon group or a covalent bond, and $R^{10}$, $R^{11}$ and $R^{12}$ independently of one another are hydrogen or $C_1$-$C_6$ alkyl or $R^{10}$ and $R^{11}$ or $R^{10}$ and $R^{12}$ together with the carbon atoms to which they are attached form a cycloaliphatic ring or a bicyclic aliphatic system.

The term "oligomeric" as used in this specification relates to compounds with a low degree of polymerization that is a number of recurring units of formula I between two and ten.

The term "polymeric" as used in this specification relates to compounds with a higher degree of polymerization that is a number of recurring units of formula I above ten.

Ar is an unsubstituted or substituted carbocyclic-aromatic hydrocarbon group or an unsubstituted or substituted heterocyclic-aromatic group. Ar has at least one aromatic nucleus.

Carbocylic-aromatic Ar groups are groups with one or more carbocyclic-aromatic nuclei, with preferably one, two, three, four or five carbocyclic aromatic rings. The aromatic rings can form a condensed system or they can be connected via a covalent bond and/or via a bridge groups, such as oxygen, carbonyl, sulfur or methylene, with each other. Examples of carbocyclic-aromatic groups are phenylene (o-, m- or p-phenylene), napthylene, anthracenylene or perylenylene.

Heterocyclic-aromatic Ar groups are groups with one or more heterocyclic-aromatic rings, carrying preferably one or two ring-heteroatoms selected from the group of nitrogen, oxygen or sulfur or combinations thereof. The aromatic rings can form a condensed system or they can be connected via a covalent bond and/or via a bridge groups, such as oxygen, carbonyl, sulfur or methylene, with each other. Examples of heterocyclic-aromatic groups are pyrrol, furan, thiophene, pyridine, pyran, pyrazine, pyrimidine, pyridazine, triazines, thiopyran, indol and bipyridine Carbocyclic-aromatic or heterocyclic-aromatic Ar groups can contain besides aromatic rings non-aromatic saturated or ethylenically unsaturated rings. These rings can be annellated with the aromatic rings or they are connected with the aromatic rings via covalent bonds or via bridge groups or they form together with the aromatic rings a bi- or polycyclic system.

These carbocyclic- or heterocyclic-aromatic groups are unsubstituted or carry one or more substituents, preferably one or two substituents. Examples for substituents are alkyl, alkenyl, alkinyl, alkoxy, hydroxyalkyl, cycloalkyl, cycloalkoxy, aryl, aryloxy, aralkyl, aralkyloxy, carboxylic add, sulfonic acid, amino, nitro, cyano, hydroxyl, hydrocarboncarbonyl, carboxylic acid ester, carboxylic acid amide, sulfonic acid ester, sulfonic acid amide, nitrile or halogen atoms or combinations of two or more from these groups or atoms.

An alkyl group as used in this specification may be straight-chain or branched-chain. An alkyl group typically has one to thirty carbon atoms, preferably one to twenty carbon atoms. Examples of alkyl groups are methyl, ethyl, propyl, isopropyl, n-butyl, sec.-butyl, tert.-butyl, pentyl, n-hexyl, n-heptyl, 2-ethylhexyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl or eicosyl. Preferred are alkyl groups with one to six carbon atoms.

An alkenyl group as used in this specification may be straight-chain or branched-chain. An alkenyl group typically has two to thirty carbon atoms, preferably two to twenty carbon atoms. Alkenyl groups typically have one ethylenically unsaturated double bond the remainder portion of the group being saturated. Two or more ethylenically unsaturated double bonds being possible but less preferred. Preferably the ethylenically unsaturated double bond is in the alpha-position of the alkenyl group. Examples of alkenyl groups are vinyl, allyl, propenyl, isopropenyl, n-butenyl, sec.-butenyl, pentenyl, n-hexenyl, n-heptenyl, 2-ethylhexenyl, n-octenyl, n-nonenyl, n-decenyl, n-undecenyl, n-dodecenyl, n-tridecenyl, n-tetradecenyl, n-pentadecenyl, n-hexadecenyl, n-heptadecenyl, n-octadecenyl, n-nonadecenyl or eicosenyl. Preferred are alkenyl groups with two and three carbon atoms, most preferred are vinyl and especially allyl.

An alkinyl group as used in this specification may be straight-chain or branched-chain. An alkinyl group typically has two to thirty carbon atoms, preferably two to twenty carbon atoms. Alkinyl groups typically have one ethylenically unsaturated triple bond the remainder portion of the group being saturated. Two or more ethylenically unsaturated triple bonds being possible but less preferred. Preferably the ethylenically unsaturated triple bond is in the alpha-position of the alkinyl group. Examples of alkinyl groups are ethinyl, propinyl, butinyl, pentinyl, n-hexinyl, n-heptinyl, 2-ethylhexinyl, n-octyinl, n-noninyl, n-decinyl, n-undecinyl, n-dodecinyl, n-tridecinyl, n-tetradecinyl, n-pentadecinyl, n-hexadecinyl, n-heptadecinyl, n-octadecinyl, n-nonadecinyl or eicosinyl. Preferred are alkinyl groups with two carbon atoms.

An alkoxy group as used in this specification may have an alkyl portion which is straight-chain or branched. An alkoxy group typically has one to thirty carbon atoms, preferably one to twenty carbon atoms in the alkyl portion. Examples of alkoxy groups are methoxy, ethoxy, isopropoxy, n-butoxy, sec.-butoxy, tert.-butoxy, pentyloxy, n-hexyloxy, n-heptyloxy, 2-ethylhexyloxy, n-octyloxy, n-nonyloxy, n-decyloxy, n-tridecyloxy, n-tetradecyloxy, n-pentadecyloxy, n-hexadecyloxy, n-octadecyloxy or eicosyloxy. Preferred are alkoxy groups with one to six carbon atoms in the alkyl portion.

A cycloalkyl group as used in this specification is typically a cyclic group with five, six or seven ring carbon atoms which can be substituted, for example with alkyl groups or wherein two alkyl groups together with the ring carbon atoms to which they are attached form another carbocyclic ring. An example for a cycloalkyl group is cyclohexyl.

A cycloalkoxy group as used in this specification is typically a cyclic group with five, six or seven ring carbon atoms one thereof being covalently attached to an oxygen atom. The ring carbon atoms of the cycloalkoxy group can be substituted, for example with alkyl groups or two alkyl groups together with the ring carbon atoms to which they are attached can form another carbocyclic ring. An example for a cycloalkoxy group is cyclohexyloxy.

Aryl groups as used in this specification have been defined above when discussing group Ar. Examples of aryl groups are those with six or ten ring carbon atoms in the ring(s), such as penyl or naphthyl.

Aryloxy groups as used in this specification are groups of formula Ar—O—, wherein Ar has been defined above. Examples of aryloxy groups are those with six or ten ring carbon atoms in the ring(s), such as penyloxy or naphthyloxy.

An example for an aralkyl group is benzyl. This group can be substituted, for example with alkyl groups or with halogen atoms.

An example for an aralkyloxy group is benzyloxy. This group can be substituted, for example with alkyl groups or with halogen atoms.

An example for a carboxylic acid amide group is carboxylic add amide, carboxylic acid N—($C_{1-4}$-alkyl)-amide or carboxylic acid N, N—($C_{1-4}$-alkyl)-diamide.

An example for a sulfonic acid amide group is sulfonic acid amide, sulfonic acid N—($C_{1-4}$-alkyl)-amide or sulfonic add N, N—($C_{1-4}$-alkyl)-diamide.

Examples for hydroxyalkyl groups are 2-hydroxyethyl, 2- or 3-hydroxypropyl. These groups can be substituted, for example with alkyl groups or with halogen atoms.

Examples for hydrocarboncarbonyl groups are alkylcarbonyl or arylcarbonyl, preferably —($C_{1-4}$-alkylcarbonyl. These groups can be substituted, for example with alkyl groups or with halogen atoms.

An example for a carboxylic acid ester group is carboxylic acid $C_1$-$C_4$-alkylester, preferably carboxylic acid methylester.

An example for a sulfonic acid ester group is sulfonic acid $C_1$-$C_4$-alkylester, preferably sulfonic acid methylester.

Halogen as used in this specification is fluorine, chlorine, bromine or iodine. Preferred are chlorine and bromine, especially preferred is chlorine.

Preferred are oligomeric or polymeric compounds, wherein Ar is a carbocyclic aromatic radical having one to six aromatic rings which are connected via covalent bonds or via divalent bridging groups or which are fused with one another and which aromatic radicals are unsubstituted or are substituted with one or more of alkyl, alkoxy, cycloalkyl, aryl, aralkyl, heteroaryl, hydrocarboncarbonyl, carboxyl, carboxylic add ester, carboxylic acid amide, nitro, hydroxyl, halogen, or wherein two adjacent alkyl substituents can form a ring system or wherein two adjacent carbonyl groups together with a nitrogen atom form a five-membered or six-membered imide ring.

Very preferred are oligomeric or polymeric compounds, wherein the five-membered imide group is a group of formula IIa and the six-membered imide group is a group of formula IIb, the CAr-atoms being C-atoms forming part of a carbocyclic aromatic ring or part of a heterocyclic aromatic ring

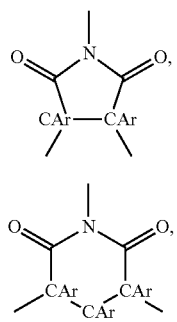

Most preferred are oligomeric or polymeric compounds, wherein Ar is phenylene, naphthylene, anthracenylene or a condensed aromatic system comprising at least four carbocyclic aromatic rings which Ar groups being unsubstituted or substituted by one to four groups selected from alkyl, alkoxy, hydrocarbon, carboxyl, carboxylic ester, nitro and/or halogen, or wherein two adjacent carbonyl groups together with a nitrogen atom form one or more imide rings in addition to the imide ring of formula I.

Very most preferred are oligomeric or polymeric compounds, wherein Ar is a group of formula IIIa, IIIb, IIIc, IIId or IIIe

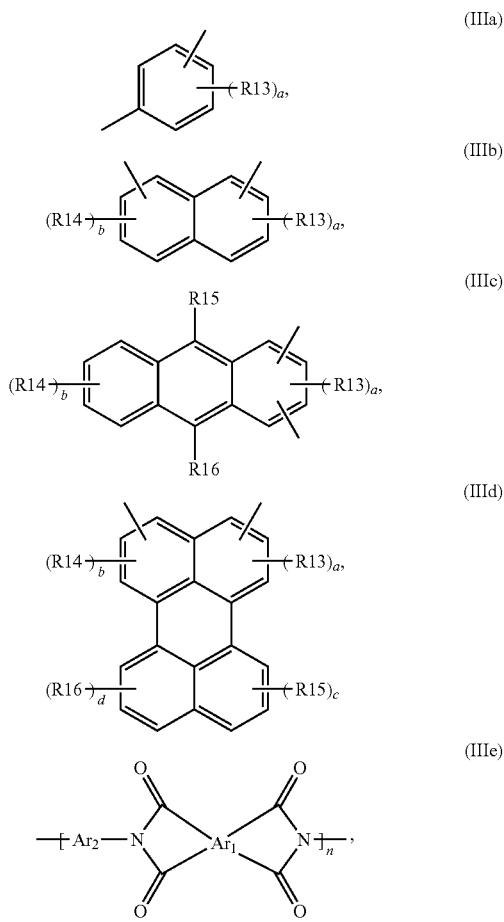

wherein the covalent bond in group IIIa is in 2, 3 or 4 position relative to the other covalent bond, the covalent bonds in group IIIb are in 1, 2- or in 2, 3- or in 1, 8-position, the covalent bonds in group IIIc are in 1, 2- or in 2, 3-position, the covalent bonds in group IIId are in 1, 2- or in 3, 4-position, the imide groups together with two ring carbon atoms in $Ar_1$ each form a five-membered or a six-membered ring, $R^{13}$, $R^{14}$, $R^{15}$ and $R^{16}$ independently of one another are hydrogen, alkyl, alkoxy, cycloalkyl, aralkyl, aryl, heteroaryl, hydrocarboncarbonyl, carboxyl, carboxylic acid ester, carboxylic acid amide, nitro, hydroxyl, halogen, or wherein two adjacent alkyl substituents can form a ring system or wherein two adjacent carbonyl groups together with a nitrogen atom form a five-membered or six-membered imide ring, a, b, c and d independently of one another are integers between 0 and 3, preferably between 0 and 2, n is an integer between 1 and 10, preferably between 1 and 5, $Ar_1$ is a tetravalent carbocyclic aromatic radical or a tetravalent heterocyclic aromatic radical with two carbonyl carbon atoms of an imide group being attached to two ring carbon atoms of the $Ar_1$ group forming together with the imide-nitrogen atom a five-membered or a six-membered ring, $Ar_2$ is a twovalent carbocyclic aromatic radical or a twovalent heterocyclic aromatic radical, and wherein Ar₁ and Ar₂ groups independently of one another are unsubstituted or are substituted with one or more of alkyl, alkoxy, cycloalkyl, aralkyl, aryl, heteroaryl, hydrocarboncarbonyl, carboxyl, carboxylic acid ester, carboxylic acid amide, nitro, hydroxyl and/or halogen.

Other preferred oligomeric or polymeric compounds are those, wherein X is a divalent-$CR^1R^2$— or —CO— group and $R^1$ to $R^2$ independently of one another are hydrogen or alkyl, preferably hydrogen.

Still other preferred oligomeric or polymeric compounds are those, wherein $R^9$ is a covalent bond, a methylene group or a phenylene group, and $R^{10}$, $R^{11}$ and $R^{12}$ independently of one another are hydrogen or $C_1$-$C_6$ alkyl.

Another group of very preferred oligomeric or polymeric compounds are those, wherein $R^9$ is a covalent bond or phenylene, $R^{10}$, $R^{11}$ and $R^{12}$ are hydrogen or one of $R^{10}$, $R^{11}$ and $R^{12}$ is methyl and the other two are hydrogen and X is methylene or carbonyl or wherein $R^9$ is a covalent bond or methylene, $R^{10}$, $R^{11}$ and $R^{12}$ are hydrogen or one of $R^{10}$, $R^{11}$ and $R^{12}$ is methyl and the other two are hydrogen and X is —Si(CH₃)₂—, —P(O)(CH₃)—, —P(O)(OCH₃)—, —P(CH₃)—, —P(OCH₃)—, —S(O)— or —S(O)₂—.

Depending on the substitution pattern in the Ar groups the oligomeric or polymeric compound reveal a reversible redox reaction which may involve one or more electrons in the range of −1 to −2 V vs. Fc/Fc+.

Preferred oligomeric or polymeric compounds of this invention contain a mixture of different Ar groups in one molecule and/or a mixture of polymer chains differing from each other by having different Ar groups per molecule.

For example, an oligomeric or polymeric compound may comprise unsubstituted Ar groups, for example unsubstituted phenylene groups and/or unsubstituted naphthylene groups, and besides these substituted Ar groups, for example halogen-substituted phenylene groups and/or halogen-substituted naphthylene groups, in one molecule.

Or a polymer mixture may be used derived for example from unsubstituted Ar groups, for example unsubstituted phenylene groups and/or unsubstituted naphthylene groups, in one group of polymers and derived for example from substituted Ar groups, for example halogen-substituted phenylene groups and/or halogen-substituted naphthylene groups, in another group of polymers.

The oligomeric or polymeric compounds of this invention typically have molecular weight averages (number average) between 1250 and 12500000 g/mol, preferably between 2500 and 15000 g/mol. The molecular weight is determined by size exclusion chromatography (SEC).

In general the number of recurring units of formula I in the oligomeric or polymeric compounds of this invention is between 5 and 50.000, preferably between 10 to 50.

The oligomeric or polymeric compounds of this invention may be derived from various oligomeric or polymeric species. The oligomeric or polymeric backbone is derived—in the broadest aspect—from ethylenically unsaturated monomers which are in turn substituted by selected pendant groups carrying imide-units. The oligomeric or polymeric backbone may be a pendant group substituted polyacrylate, polymethacrylate, polynorbonene, polypropylene, polyethylene, polystyrene, polyvinylether, or a mixture of two or more species.

The oligomeric or polymeric compounds of this invention may be homopolymers, meaning they are derived from one kind of monomer, or may be copolymers, meaning they are derived from two or more kinds of monomers. If two or more monomers are used, the oligomeric or polymeric compounds of this invention may contain the recurring units derived from one monomer in statistical distribution or recurring units derived from one monomer form blocks which are present in the oligomeric or polymeric compound.

The oligomeric or polymeric compounds of this invention may be linear polymers or may by crosslinked, for example by using small amounts of bi- or higher-functional monomers during the polymerization.

The oligomeric or polymeric compounds of this invention may be prepared by a simple process using standard equipment and using easily accessible starting materials.

The invention also relates to a process for preparing an oligomeric or polymeric compound comprising at least two structural units of above-defined formula I, said process comprising the steps:

i) reacting a compound of formula IV with a compound of formula V

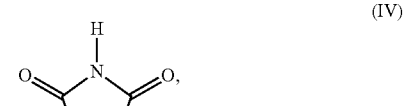

(IV)

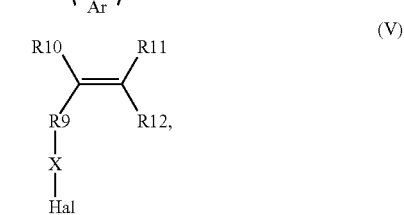

(V)

in the presence of a base and a compound of formula $(PC^+)_e AN^{e-}$ to result in a monomer compound of formula VI

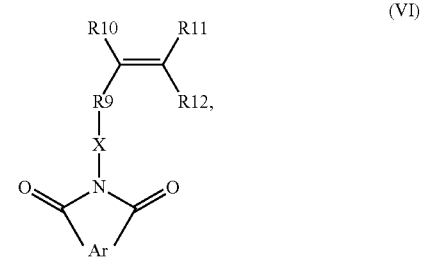

(VI)

wherein

Ar, $R^9$, $R^{10}$, $R^{11}$, $R^{12}$ and X have the meaning defined above,

Hal is a halogen atom, $PC^+$ is a cation selected from the group of $[NR^{17}R^{18}R^{19}R^{20}]^+$, $[PR^{17}R^{18}R^{19}R^{20}]^+$ and $[SbR^{17}R^{18}R^{19}R^{20}]^+$, with $R^{17}$, $R^{18}$, $R^{19}$ and $R^{20}$ independently of one another being hydrogen, alkyl, cycloalkyl aryl or heteroaryl, $AN^{e-}$ being a e-valent anion, and e being an integer of 1 or 2, and ii) subjecting the monomer of formula VI and optionally other monomers copolymerizable therewith to conditions of radical, anionic, cationic or metalorganic polymerization to result in a polymer comprising recurring units of formula I defined above.

The monomer of formula VI can be synthesized in a solvent free reaction system which contains a substituted or unsubstituted imide of formula IV and a halogen compound of formula V, for example an alkylhalogenide or an acid halogenide containing an ethylenically unsaturated polymerizable group, a base and a compound of formula $(PC^+)_e AN^-$.

Imides of formula IV are compounds having a five-membered or six-membered imide ring which is covalently connected with an aromatic system. Examples of imides of formula IV are phthalic acid imide, naphthaline-1,8-dicarboxylic acid imide, naphthaline-1,2-dicarboxylic add imide, naphthaline-2,3-dicarboxylic acid imide, anthracene-1,2-dicarboxylic acid imide, anthracene-2,3-dicarboxylic acid Imide, anthracene-1,9-dicarboxylic acid imide, perylene-3,4-dicarboxylic acid imide and oligomeric imides with 1 to 10 recurring units derived from pyromellitic acid and from diamino benzene, or from perylene-3,4,9,10-tetracarboxylic acid and from diamino benzene, or from biphenyl-3, 3', 4, 4'-tetracarboxylic acid and from diamino benzene, or from benzophenone-3, 3', 4, 4'-tetracarboxylic acid and from diamino benzene or from the corresponding oligomers using 4, 4'-diaminobiphenyl and/or 4, 4'-diaminodiphenylether and/or 4, 4'-diamino-diphenylmethane instead of or in addition to diamino benzene and the corresponding mono- and difluoro-substituted derivatives of these imides.

The halogen compound of formula V is preferably of bromide or most preferred a chloride.

Depending on the nature of group X the compound of formula V may be an ethylenically unsaturated alkylene halide, preferably vinyl chloride or allyl chloride; or an ethylenically unsaturated cylcoalkylene halide, preferably 5-(chloromethyl)-bicyclo[2.2.1]hept-2-ene or 5,6-bis(chloromethyl)bicyclo[2.2.1]hept-2-ene; or an ethylenically unsaturated benzyl halide, most preferably a vinyl benzyl chloride; or a halide of an ethylenically unsaturated carboxylic acid, preferably a chloride of an ethylenically unsaturated carboxylic acid, most preferred a chloride of acrylic acid, a chloride of methacrylic acid or a chloride of norbornene carboxylic acid; or a silyl halogenide with an ethylenically unsaturated group, preferably a dimethyl-vinyl-silyl chloride or a dimethyl-allyl-silyl chloride; or a halogen phosphine $R^{11}R^{12}C=CR^{10}-R^9-PR^7Hal$, preferably a vinylphosphine halide or an allylphosphine halide, most preferred a vinylphosphine chloride or an allylphosphine chloride; or a halogen phosphine oxide $R^{11}R^{12}C=CR^{10}-R^9-P(O)R^5Hal$, preferably a vinylphosphineoxyhalide or an allylphosphineoxyhalide, most preferred a vinylphosphineoxychloride or an allylphosphineoxychloride; or a halogen phosphinite $R^{11}R^{12}C=CR^{10}-R^9-P(OR^8)Hal$, preferably a vinylphosphinite halide or an allylphosphinite halide, most preferred a vinylphosphinite chloride or an allylphosphinite chloride; or a phosphinic acid halogenide $R^{11}R^{12}C=CR^{10}-R^9-P(O)(OR^6)Hal$, preferably a vinylphosphinic acid halide or an allylphosphinic acid halide, most preferred a vinylphosphinic acid chloride or an allylphosphinic acid chloride; or a sulfinic acid halogenide $R^{11}R^{12}C=CR^{10}-R^9-S(O)Hal$, preferably a vinylsulfinic acid halide or an allylsulfinic acid halide, most preferred a vinylsulfinic acid chloride or an allylsufinic acid chloride; or a sulfonic acid halogenide $R^{11}R^{12}C=CR^{10}-R^9-S(O)_2Hal$, preferably a vinylsulfonic add halide or an allylsulfonic add halide, most preferred a vinylsulfonic acid chloride or an allylsulfonic acid chloride.

In these formulae groups $R^6$, $R^7$, $R^8$, $R^9$, $R^{10}$, $R^{11}$ and $R^{12}$ have the meanings defined above and Hal is a halogen atom.

The compounds of formulae IV and V are readily available and can be produced using standard synthesis techniques of organic chemistry. Some of these compounds are commercially available.

As a base any compound may be used that is capable under reaction conditions to react with the nitrogen hydrogen of the imide of formula IV to form the corresponding imide-salt. Thus, the imide group —NH— is transformed into a —$N^-K^+$ group and the base $K^+An^-$ is transformed into the corresponding hydrogen compound $HAn^-$, wherein $K^+$ is the cation of the base and $An^-$ is the anion of the base. Examples of bases are inorganic carbonates, inorganic hydroxides, inorganic hydrogencarbonates, preferably carbonates, hydrogencarbonates and hydroxides of the alkaline metals or of the earth alkaline metals, most preferred carbonates, hydrogencarbonates and hydroxides of sodium and potassium.

The compounds of formula $(PC^+)_e AN^{e-}$ are typically ionic compounds which can be also used as catalysts in phase transfer reactions. These compounds can be selected from the group of ammonium salts, of phosphonium salts and of antimonium salts. Examples of these compounds are mono-, di-, tri- or tetraalkylammonium halides or pseudohalides, mono-, di-, tri- or tetraalkylphosphonium halides or pseudohalides, and mono-, di-, tri- or tetraalkylantimonium halides or pseudohalides. Any anions $An^{e-}$ may be used, preferably two-valent anions and most preferred one-valent anions. Inorganic anions, such as halide anions or pseudohalige anions may be used, or organic anions, such as alkylsulfonate anions, perfluoroalkylsulfonate anions, carboxylate anions or perfluorocarboxylate anions may be used.

Examples of most preferred compounds of formula $(PC^+)_e AN^{e-}$ are tetrealkylammonium salts, such as tetrabutylammonium salts, tetraethylammonium salts and tetraoctyl-ammonium salts, with different anions such as with fluorine, bromine, chlorine, iodine or triflate.

The reaction of compounds of formulae IV and V can be carried out in solution, dispersion, suspension of compounds of formulae IV and V or in a blend of said compounds without any adjuvants (besides base and compound of formula $(PC^+)_e AN^{e-}$).

Solvents, dispersants or suspension agents, if present, must be chosen to avoid any side reactions, for example to avoid reactions of halides with said solvents, dispersants or suspension agents.

Devices for carrying out the reaction between compounds of formulae IV and V are well known in the art. Any type of blending or compounding device can be used. Examples thereof are mixers, mills, mortars or extruders. Preferably a ball mill is used as a blending device.

In a preferred embodiment of the invention the reaction between compounds of formulae IV and V is carried out in substance, thus only said compounds and said base and said compound of formula $(PC^+)_e AN^{e-}$ are present. In this preferred embodiment the reaction is carried out in a ball mill or in a mortar. This embodiment is easy to implement and readily available equipment can be used.

The blending time of compounds of formulae IV and V is typically between 1 minute and 1 hour, preferably between 1 and 30 minutes. The total reaction time is typically between 5 minutes and 5 hours, preferably between 30 minutes and 3 hours.

The reaction temperature during the reaction time is typically between 10° C. and 100° C., preferably between 20° C. and 50° C.

After the reaction is completed the reaction mixture is optionally filtrated to separate from liquid components and the solid reaction mixture is washed with an appropriate solvent to remove the inorganic salts. The solvent may be selected from a group consisting protic organic and inorganic solvents such as water, lower aliphatic alcohols, such as methanol, ethanol and Isopropanol, or lower carboxylic acids, such as formic acid or acetic acid.

In a preferred process Hal is chlorine, PC is a cation $[NR^{17}R^{18}R^{19}R^{20}]^+$ with $R^{17}$, $R^{18}$, $R^{19}$ and $R^{20}$ independently of one another being hydrogen or alkyl, at least one of groups $R^{17}$, $R^{18}$, $R^{19}$ and $R^{20}$ being alkyl, $AN^{e-}$ is a halogen anion, preferably a chloride anion, e is 1, and the base being selected from the group of alkaline methal hydroxides, alkaline metal carbonates and alkaline metal hydrogencarbonates.

In a very preferred version the process is performed in the absence of any solvent in a mixing device, in a ball mill or in an extruder.

After the monomer of formula VI has been produced the polymeric compounds comprising units of formula I are produced by polymerization by using an appropriate polymerization technique. Examples of polymerization techniques are polymerization in bulk (substance), emulsion polymerization, suspension polymerization, precipitation polymerisation and polymerisation in solution. The skilled artisan is aware of these polymerization techniques. The polymerization can occur as free-radical polymerization, as anionic addition polymerization, as reversible addition fragmentation chain transfer polymerization (RAFT), as atom transfer radical polymerization (ATRP), as nitroxide mediated polymerization (NMP), as cobalt mediated radical polymerization (CMRP), as cationic addition polymerization or as metal-organic catalyst mediated polymerization, such as polymerization using Ziegler-Natta catalysts or using metallocene catalysts. The skilled artisan is well aware of these polymerization methods and of the measures necessary to perform such polymerisation methods.

For free-radical polymerization, for example, a suitable starter compound is needed, for example a radical source, such as an organic peroxide, an organic hydroperoxide, a radical generating redox system or an azo compound, such as azo-bis-(isobutyronitrile) (AIBN).

Preferably the polymerisation of the monomers of formula VI is performed as free radical polymerization in a solvent or in the absence of a solvent using a starter compound.

Preferably, in the polymerization reaction for the manufacture of the oligomeric or polymeric compounds containing units of formula I different monomers of formula VI are used. This enables to produce an oligomeric or polymeric compound with a predetermined redox-potential.

Besides the monomer(s) of formula VI other monomer copolymerizable with said monomer(s) can be used in the polymerization reaction. Examples of such monomers are ethylenically unsaturated compounds different from monomers of formula VI.

These other monomers can be alpha-olefins, such as ethylene, propylene or 1-butene, ethylenically unsaturated carboxylic acids, such as acrylic acid, methacrylic acid, itaconic acid, fumaric acid or maleic acid, ethylenically unsaturated sulfonic adds, such as vinyl sulfonic acid, alkyl esters of ethylenically unsaturated carboxylic acids, such as the methyl esters or the ethyl esters of the above-defined ethylenically unsaturated carboxylic acids, alkyl esters of ethylenically unsaturated sulfonic acids, such as the methyl ester or the ethyl ester of vinylsulfonic acid, ethylenically unsaturated carboxylic acid amides, such as the amides of the above-defined ethylenically unsaturated carboxylic acids, vinyl aromatic systems, such as styrene, or unsaturated bi- or polycyclic systems, such as norbornene.

The oligomeric or polymeric compound comprising units of formula I of the invention can be used as redox-active materials in storage means for electric energy. Depending on the counter electrode, the oligomeric or polymeric compound of this invention can be used in a cathode or in an anode. Without being bound to a theory it is believed that the polyimide rings in the oligomeric or polymeric material can be charged with electrons which are delocalized via the Imide ring and stabilized by the aromatic system forming part of the imide ring. Surprisingly the oligomeric or polymeric material of the invention can be charged and discharged during numerous cycles without any essential degradation of the material.

The invention also relates to an electrode comprising the above defined oligomeric or polymeric compound comprising units of formula I in combination with an electrically conductive material and optionally in combination with a binder agent.

Electrically conducting materials which can be used in combination with the oligomeric or polymeric material of the invention can be metallic conductors or semiconductors. Typically the electrically conducting material has an electrical conductivity above $1 \times 10^6$ S/m, preferably within the range of $3 \times 10^6$ and $1 \times 10^7$ S/m.

Examples of electrically conducting materials are metals, such as copper, silver, iron, nickel, chromium or gold, inorganic semiconductors, such as silicon, germanium and gallium arsenide, electrically conducting and electrically semiconducting carbon-containing materials, such as graphite, grapheme, fullerenes, carbon black, polypyrroles, polythiophenes, polyphenylenes, polypyrenes, polyazulenes, polynaphthylenes, polycarbazoles, polyindoles, polyazepines, polyanilines, polyphenylenesulfides, polyacetylenes, and poly-(p-phenylene vinylene).

Examples of binder agents are polyamides, polyesters, polyacrylnitrile, polyimides, polyacrylates, polyvinylchloride, polyvinylidenefluorlde, polycarbonates, polyolefins, cellulose and its derivates and dextrans.

The electrodes or the oligomeric or polymeric materials of the present invention can be used in different storage devices for electric energy. Examples thereof are batteries, redox-flow cells, fuel cells or capacitors.

The invention also relates to the use of the oligomeric or polymeric compounds comprising units of formula I as an electrically active material in batteries, in redox-flow cells in fuel cells or in capacitors.

In the following the application of the electrically redox-active material of this invention is described in the formation of metal organic batteries. However, this is one use example only. The material can alternatively be used in other energy storage systems.

As an example of a metal organic battery a device is described which comprises the oligomeric or polymeric electrically redox-active material of this invention as a cathode material.

The device consists of 4 layers. Layers 1 and 2 form the cathode. Herein, layer 1 acts as a current collector and may be selected from a group consisting of graphite foil, aluminum foil, indium-tin-oxide (ITO) on glass/PET (polyethylene terephthalate) or an electrically conductive oligomeric or polymeric compound. Layer 2 is a composite consisting of the oligomeric or polymeric electrically active material of this invention, (additionally but not necessary) of a conducting additive and of a binding additive.

The conducting additive may be selected from a group consisting of carbon materials such as graphite, carbon nano fibers, graphene or carbon black.

The binding additive may be selected from a group consisting of polyvinylidenfluoride (PVdF), polyvinylchloride (PVC) or cellulose derivates, such as cellulose ethers or esters. The ratio of the components in the composite may vary within broad limits.

Layer 3 consists of an electrolyte which may be selected to be a liquid or an oligomeric or polymeric ion-conducting material.

If the electrolyte is selected to be liquid, it may consist of a mixture of a polar or aprotic solvent and a conducting salt. The solvent may be selected from a group consisting of acetonitrile, organic carbonate, dimethylformamide, dimethylacetamide (DMAc), N-methylpyrrolidone (NMP), tetrahydrofurane, ethyl acetate, acetone, cyclopentyl-methylether, 1,3-dioxolane, 1,2-dimethoxyethane, water and dimethyl sulfoxide.

The conducting salt may be selected from a group comprising a metal cation $M^{e+}$ and an anion $An^{f-}$ of formula $(M^{e+})_a(An^{f-})_b$, wherein e and f are integers corresponding to the valency of M and An, a and b are integers representing the molecular constitution of the salt, with the product of e*b being equal to the product of f*a, wherein An may be selected from a group consisting of perchlorate, chlorate, halide, pseudohalide, carboxylate and sulfonate and M may be selected from the metal used in layer 4.

Layer 4 may be a metal foil. The metal may be selected from U, Na, K, Mg and Ca.

As another example of an all organic battery a device is described which comprises the oligomeric or polymeric electrically active material of this invention as an anode material.

The device consists of 5 layers.

Layers 1 and 2 form the cathode. Layer 1 acts as a current collector and may be selected from a group consisting of graphite foil, aluminum foil, ITO on glass/PET or an electrically conducting oligomeric or polymeric compound.

Layer 2 is a composite consisting of a redox active polymer with a higher redox potential than the polymer described in this invention, a conducting additive and a binding additive. The conducting additive may be selected from a group consisting of carbon materials such as graphene, graphite, carbon nanofibers or carbon black. The binding additive may be selected from a group consisting of PVdF, PVC or cellulose derivates. The ratio of the components in the composite may vary within broad limits. An example for this redox active polymer is poly(2,2,6,6-tetramethylpiperidinyloxy-methacrylate) (PTMA).

Layer 3 consists of an electrolyte which may be selected to be a liquid or a polymeric ion-conducting material.

If the electrolyte is selected to be liquid, it may consist of a mixture of a polar aprotic solvent and an conducting salt.

The solvent may be selected from a group consisting of acetonitrile, organic carbonate, dimethylformamide, dimethylacetamide (DMAc), N-methylpyrrolidone (NMP), tetrahydrofurane, ethyl acetate, acetone, cyclopentyl-methylether, 1,3-dioxolane, 1,2-dimethoxyethane, water and dimethyl sulfoxide.

Layer 4 is a composite consisting of a redox active polymeric material according to the invention, a conducting additive and a binding additive. The conducting additive may be selected from a group consisting of carbon materials such as graphene, graphite, carbon nanofibers or carbon black. The binding additive may be selected from a group consisting of PVdF, PVC or cellulose derivates. The ratio of the components in the composite may vary within broad limits.

Layer 5 acts as a current collector and may be selected from a group consisting of graphite foil, aluminum foil, ITO on glass or an electrically conducting polymeric compound.

The following examples are intended to illustrate the invention without limitation thereof.

EXAMPLE 1

Synthesis of 5-methyl-2-(4-vinylbenzyl)isoindoline-1,3-dione 0.5 g 4-Methylphthallmide (3.10 mmol), 0.53 mL 4-vinylbenzylchloride (3.72 mmol, 1.2 eq), 100 mg tetra-n-buytlammoniumbromide (0.31 mmol) and 1.29 g potassium carbonate (9.30 mmol, 3 eq), were blended for 5 min with pestle in a montar. After standing for 1 h at room temperature water (50 mL) was added to the mixture and the suspension was filtered. The filtrate was washed with water (50 mL) and methanol (50 mL) dried under vacuum to yield 0.75 g 4-methyl-2-(4-vinylbenzyl)isoindoline-1,3-dione (87%) as pale yellow powder.

EXAMPLE 2

Synthesis of poly(5-methyl-2-(4-vinylbenzyl)isoindoline-1,3-dione)

711 mg of 5-methyl-2-(4-vinylbenzyl)isoindoline-1,3-dione (2.56 mmol) and 8.42 mg of AIBN (0.05 mmol, 0.02 eq) were dissolved in degassed THF. The reaction mixture was stirred for 18 h at 75° C. and was then poured into could ether. The precipitate was filtered and after reprecipitation from cold ether 680 mg polymer (86%) was obtained as white powder (SEC, DMAc: $M_n$ 9,500 g/mol PS standard).

EXAMPLE 3

Electrode Preparation

The polymer/carbon nanocomposite electrode was prepared by coating about 0.6 mg of a slurry of the polymer (5.47 mg), wafer-grown carbon fibers (VGCF) (85 mg), and PVdF (10 mg) in NMP (1 mL) on an graphite foil (1 cm²) and allowing the NMP to evaporate at 40° C. under vacuum for 12 h to give the poolymer/carbon composite layer at 20-50 mm in thickness with a ratio of polymer/VGCF/PVdF (5/85/10)

EXAMPLE 4

Fabrication and Characterization of Test Cells

A coin cell was manufactured by sandwiching the electrode layer of 0.1 M tetrabutylammonium perchlorate (TBA- $ClO_4$) in acetonitrile with a polymer carbon nanofibre composite coated electrode and a PTMA carbon nanofibre composite coated on a graphite foil as cathode with a composition of PTMA/VGCF/PVdF=5/85/10 (w/w/w), using a separator film (cell guard #2400 from Holsten Co.) under argon atmosphere. The amount of the anode and cathode active material was adjusted to obtain equal capacities. Cycles performance of these cells were examined by repeated charge discharge glavanostatic cycles at different current densities. These experiments were typically performed at 10° C. After 250 cycles the capacity maintained at 90% of the original capacity.

The invention claimed is:

1. An electrode, comprising an oligomeric or polymeric compound as a redox-active material in combination with an electrically conductive material and optionally in combination with a binder agent, wherein:

the oligomeric or polymeric compound comprises at least two structural units of formula (I):

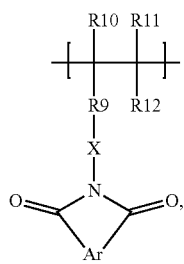

Ar is a carbocyclic aromatic radical or a heterocyclic aromatic radical with the two carbonyl carbon atoms being attached to two ring carbon atoms of the Ar group forming together with the imide-nitrogen atom a five-membered or a six-membered ring;

X is a divalent group selected from the group consisting of —$CR^1R^2$—, —CO—, —$SiR^3R^4$—, —$P(O)R^5$—, —$P(O)(OR^6)$—, —$PR^7$—, —$P(OR^8)$—, —S(O)— and —$S(O)_2$—;

$R^1$ to $R^8$ independently of one another are hydrogen, alkyl, cycloalkyl, aryl or heteroaryl groups;

$R^9$ is a divalent hydrocarbon group or a covalent bond; and $R^{10}$, $R^{11}$ and $R^{12}$ independently of one another are hydrogen or $C_1$-$C_6$ alkyl or $R^{10}$ and $R^{11}$ or $R^{10}$ and $R^{12}$ together with the carbon atoms to which they are attached form a cycloaliphatic ring or a bicyclic aliphatic system.

2. The electrode according to claim 1, wherein the oligomeric or polymeric compound is combined with a metal, a semiconducting inorganic material, an electrically conducting manic material, or a semiconducting organic material.

3. A battery, a redox-flow cell, or a fuel cell, comprising an oligomeric or polymeric compound comprising at least two structural units of formula (I):

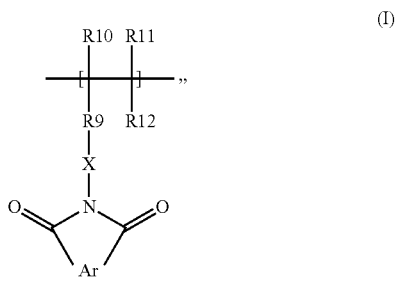

wherein:

Ar is a carbocyclic aromatic radical or a heterocyclic aromatic radical with the two carbonyl carbon atoms being attached to two ring carbon atoms of the Ar group forming together with the imide-nitrogen atom a five-membered or a six-membered ring, X is a divalent group selected from the group consisting of —$CR^1R^2$—, —CO—, —$SiR^3R^4$—, —$P(O)R^5$—, —$P(O)(OR^6)$—, —$PR^7$—, —$P(OR^8)$—, —S(O)— and —$S(O)_2$—;

$R^1$ to $R^8$ independently of one another are hydrogen, alkyl, cycloalkyl, aryl or heteroaryl groups;

$R^9$ is a divalent hydrocarbon group or a covalent bond; and $R^{10}$, $R^{11}$ and $R^{12}$ independently of one another are hydrogen or $C_1$-$C_6$ alkyl or $R^{10}$ and $R^{11}$ or $R^{10}$ and $R^{12}$ together with the carbon atoms to which they are attached form a cycloaliphatic ring or a bicyclic aliphatic system.

4. The electrode of claim 1, wherein Ar is a carbocyclic aromatic radical having one to six aromatic rings which are connected via covalent bonds or via divalent bridging groups or which are fused with one another and which aromatic radicals are unsubstituted or are substituted with one or more of alkyl, alkenyl, alkinyl, alkoxy, cycloalkyl, aryl, aralkyl, heteroaryl, hydrocarboncarbonyl, carboxyl, carboxylic acid ester, carboxylic acid amide, amino, nitro, cyano, hydroxyl, halogen, or wherein two adjacent alkyl substituents form a ring system or wherein two adjacent carbonyl groups together with a nitrogen atom form a five-membered or six-membered imide ring.

5. The electrode of claim 1, wherein the five-membered imide group is a group of formula (IIa) and the six-membered imide group is a group of formula (IIb), the CAr-atoms being C-atoms forming part of a carbocyclic aromatic ring or part of a heterocyclic aromatic ring:

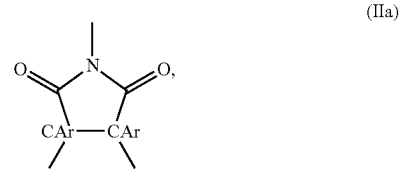

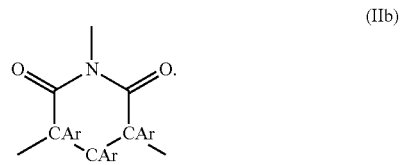

6. The electrode of claim 1, wherein Ar is phenylene, naphthylene, anthracenylene or a condensed aromatic system comprising at least four carbocyclic aromatic rings which Ar group being unsubstituted or substituted by one to four groups selected from the group consisting of alkyl, alkoxy, hydrocarbon, carboxyl, carboxylic ester, nitro and halogen, or wherein two adjacent carbonyl groups together with a nitrogen atom form one or more imide rings in addition to the imide ring of formula (I).

7. The electrode of claim 6, wherein Ar is a group of formula (IIIa), (IIIb), (IIIc), (IIId) or (IIIe):

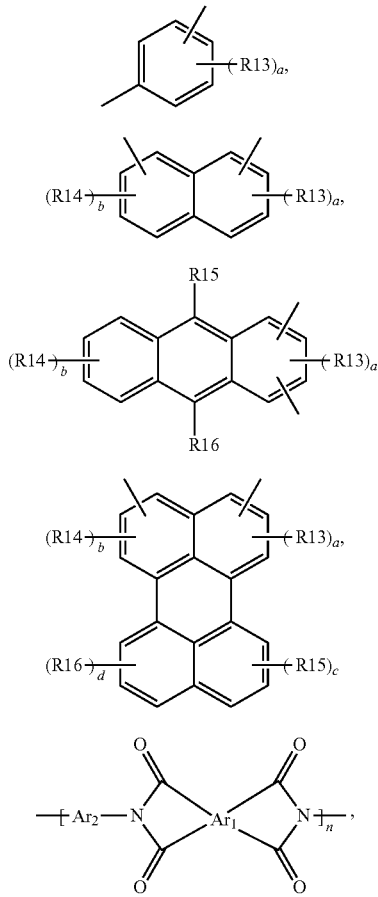

wherein:
the covalent bond in group (IIIc) is in 2, 3 or 4 position relative to the other covalent bond,
the covalent bonds in group (IIIb) are in 1, 2- or in 2, 3- or in 1, 8-position,
the covalent bonds in group (IIIc) are in 1, 2- or in 2, 3-position,
the covalent bonds in group (IIId) are in 1, 2- or in 3, 4-position,
the imide groups together with two ring carbon atoms in $Ar_1$ each form a five-membered or a six-membered ring,
$R^{13}$, $R^{14}$, $R^{15}$ and $R^{16}$ independently of one another are hydrogen, alkyl, alkoxy, cycloalkyl, aralkyl, aryl, heteroaryl, hydrocarboncarbonyl, carboxyl, carboxylic acid ester, carboxylic acid amide, nitro, hydroxyl, halogen, or wherein two adjacent alkyl substituents can form a ring system or wherein two adjacent carbonyl groups together with a nitrogen atom form a five-membered or six-membered imide ring, a, b, c and d independently of one another are integers between 0 and 3,
n is an integer between 1 and 10,
$Ar_1$ is a tetravalent carbocyclic aromatic radical or a tetravalent heterocyclic aromatic radical with two carbonyl carbon atoms of an imide group being attached to two ring carbon atoms of the $Ar_1$ group forming together with the imide-nitrogen atom a five-membered or a six-membered ring,
$Ar_2$ is a twovalent carbocyclic aromatic radical or a twovalent heterocyclic aromatic radical, and wherein
$Ar_1$ and $Ar_2$ groups independently of one another are unsubstituted or are substituted with one or more of alkyl, alkoxy, cycloalkyl, aralkyl, aryl, heteroaryl, hydrocarboncarbonyl, carboxyl, carboxylic acid ester, carboxylic acid amide, nitro, hydroxyl and/or halogen.

8. The electrode of claim 1, wherein:
X is a divalent —$CR^1R^2$— or —CO— group; and
$R^1$ to $R^2$ independently of one another are hydrogen or alkyl.

9. The electrode of claim 1, wherein:
$R^9$ is a covalent bond, a methylene group or a phenylene group, and
$R^{10}$, $R^{11}$ and $R^{12}$ independently of one another are hydrogen or $C_1$-$C_6$ alkyl.

10. The electrode of claim 9, wherein:
$R^9$ is a covalent bond or phenylene,
$R^{10}$, $R^{11}$ and $R^{12}$ are hydrogen or one of $R^{10}$, $R^{11}$ and $R^{12}$ is methyl and the other two are hydrogen, and
X is methylene or carbonyl.

11. The electrode of claim 9, wherein:
$R^9$ is a covalent bond or methylene,
$R^{10}$, $R^{11}$ and $R^{12}$ are hydrogen or one of $R^{10}$, $R^{11}$ and $R^{12}$ is methyl and the other two are hydrogen, and
X is —$Si(CH_3)_2$—, —$P(O)(CH_3)$—, —$P(O)(OCH_3)$—, —$P(CH_3)$—, —$P(OCH_3)$—, —$S(O)$— or —$S(O)_2$—.

12. The battery, the redox-flow cell, or the fuel cell of claim 3, wherein Ar is a carbocyclic aromatic radical having one to six aromatic rings which are connected via covalent bonds or via divalent bridging groups or which are fused with one another and which aromatic radicals are unsubstituted or are substituted with one or more of alkyl, alkenyl, alkenyl, alkoxy, cycloalkyl, aryl, aralkyl, heteroaryl, hydrocarboncarbonyl, carboxyl, carboxylic acid ester, carboxylic acid amide, amino, nitro, cyano, hydroxyl, halogen, or wherein two adjacent alkyl substituents form a ring system or wherein two adjacent carbonyl groups together with a nitrogen atom form a five-membered or six-membered imide ring.

13. The battery, the redox-flow cell, or the fuel cell of claim 3, wherein the five-membered imide group is a group of formula (IIa) and the six-membered imide group is a group of formula (IIb), the CAr-atoms being C-atoms forming part of a carbocyclic aromatic ring or part of a heterocyclic aromatic ring:

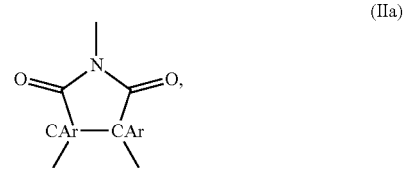

-continued

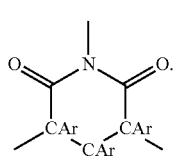
(IIb)

14. The battery, the redox-flow cell, or the fuel cell of claim 3, wherein Ar is phenylene, naphthylene, anthracenylene or a condensed aromatic system comprising at least four carbocyclic aromatic rings which Ar group being unsubstituted or substituted by one to four groups selected from the group consisting of alkyl, alkoxy, hydrocarbon, carboxyl, carboxylic ester, nitro and halogen, or wherein two adjacent carbonyl groups together with a nitrogen atom form one or more imide rings in addition to the imide ring of formula (I).

15. The battery, the redox-flow cell, or the fuel cell of claim 14, wherein Ar is a group of formula (IIIa), (IIIb), (IIIc), (IIId) or (IIIe):

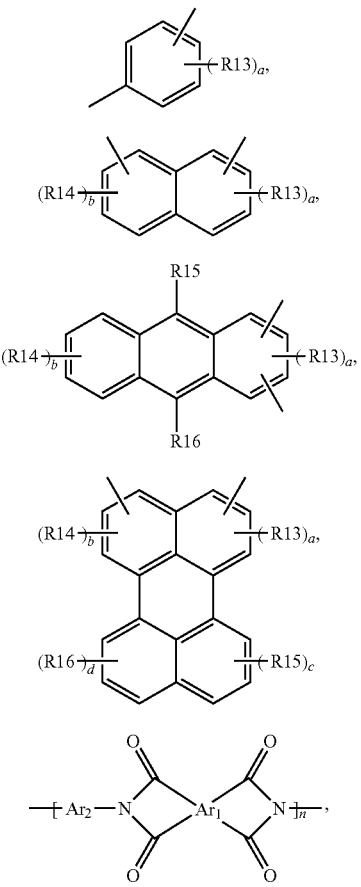

wherein:
the covalent bond in group (IIIc) is in 2, 3 or 4 position relative to the other covalent bond,
the covalent bonds in group (IIIb) are in 1, 2- or in 2, 3- or in 1, 8-position,
the covalent bonds in group (IIIc) are in 1, 2- or in 2, 3-position,
the covalent bonds in group (IIId) are in 1, 2- or in 3, 4-position,
the imide groups together with two ring carbon atoms in $Ar_1$ each form a five-membered or a six-membered ring,
$R^{13}$, $R^{14}$, $R^{15}$ and $R^{16}$ independently of one another are hydrogen, alkyl, alkoxy, cycloalkyl, aralkyl, aryl, heteroaryl, hydrocarboncarbonyl, carboxyl, carboxylic acid ester, carboxylic acid amide, nitro, hydroxyl, halogen, or wherein two adjacent alkyl substituents can form a ring system or wherein two adjacent carbonyl groups together with a nitrogen atom form a five-membered or six-membered imide ring,
a, b, c and d independently of one another are integers between 0 and 3,
n is an integer between 1 and 10,
$Ar_1$ is a tetravalent carbocyclic aromatic radical or a tetravalent heterocyclic aromatic radical with two carbonyl carbon atoms of an imide group being attached to two ring carbon atoms of the $Ar_1$ group forming together with the imide-nitrogen atom a five-membered or a six-membered ring,
$Ar_2$ is a twovalent carbocyclic aromatic radical or a twovalent heterocyclic aromatic radical, and wherein
$Ar_1$ and $Ar_2$ groups independently of one another are unsubstituted or are substituted with one or more of alkyl, alkoxy, cycloalkyl, aralkyl, aryl, heteroaryl, hydrocarboncarbonyl, carboxyl, carboxylic acid ester, carboxylic acid amide, nitro, hydroxyl and/or halogen.

16. The battery, the redox-flow cell, or the fuel cell of claim 3, wherein:
X is a divalent —$CR^1R^2$— or —CO— group; and
$R^1$ to $R^2$ independently of one another are hydrogen or alkyl.

17. The battery, the redox-flow cell, or the fuel cell of claim 3, wherein:
$R^9$ is a covalent bond, a methylene group or a phenylene group, and
$R^{10}$, $R^{11}$ and $R^{12}$ independently of one another are hydrogen or $C_1$-$C_6$ alkyl.

18. The battery, the redox-flow cell, or the fuel cell of claim 17, wherein:
$R^9$ is a covalent bond or phenylene,
$R^{10}$, $R^{11}$ and $R^{12}$ are hydrogen or one of $R^{10}$, $R^{11}$ and $R^{12}$ is methyl and the other two are hydrogen, and
X is methylene or carbonyl.

19. The battery, the redox-flow cell, or the fuel cell of claim 17, wherein:
$R^9$ is a covalent bond or methylene,
$R^{10}$, $R^{11}$ and $R^{12}$ are hydrogen or one of $R^{10}$, $R^{11}$ and $R^{12}$ is methyl and the other two are hydrogen, and
X is —$Si(CH_3)_2$—, —$P(O)(CH_3)$—, —$P(O)(OCH_3)$—, —$P(CH_3)$—, —$P(OCH_3)$—, —$S(O)$— or —$S(O)_2$—.

* * * * *